United States Patent

Fischer et al.

Patent Number: 5,218,050
Date of Patent: Jun. 8, 1993

[54] COMPATIBLE POLYMER BLENDS

[75] Inventors: Jens-Dieter Fischer, Bickenbach; Werner Siol, Darmstadt-Eberstadt, both of Fed. Rep. of Germany

[73] Assignee: Rohm GmbH Chemische Fabrik, Darmstadt, Fed. Rep. of Germany

[21] Appl. No.: 718,435

[22] Filed: Jun. 20, 1991

[30] Foreign Application Priority Data

Jun. 20, 1990 [DE] Fed. Rep. of Germany ....... 4019626

[51] Int. Cl.$^5$ ............................................. C08L 71/12
[52] U.S. Cl. ..................................... 525/132; 525/392
[58] Field of Search ................................. 525/132, 392

[56] References Cited

U.S. PATENT DOCUMENTS

| 4,808,674 | 2/1989 | Johnson et al. | 525/905 |
| 4,866,130 | 9/1989 | Brown et al. | 525/92 |
| 4,889,894 | 12/1989 | Siol et al. | 525/227 |
| 4,900,791 | 2/1990 | Siol et al. | 525/306 |
| 4,997,883 | 3/1991 | Fischer et al. | 525/309 |
| 5,063,112 | 11/1991 | Gross et al. | 525/148 |
| 5,091,477 | 2/1992 | Bueschl et al. | 525/905 |

FOREIGN PATENT DOCUMENTS 0306774 3/1989 European Pat. Off. .

OTHER PUBLICATIONS

Chemical Abstracts, vol. 109, No. 26, Dec. 26, 1988, 232147a, & JP-A-63-125-567, May 28, 1988, H. Sano, et al., "Impact-Resistant Polyoxphenylene Compositions".

Primary Examiner—James J. Seidleck
Assistant Examiner—Thomas Hamilton, III
Attorney, Agent, or Firm—Oblon, Spivak, McClelland, Maier & Neustadt

[57] ABSTRACT

Compatible polymer blends containing 0.5-99.5 wt. %, preferably 50 to 90 wt. % of a polyphenylene ether, synthesized from units of formula (I)

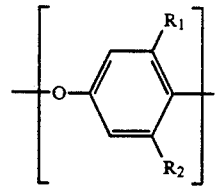

where $R_1$ stands for an optionally substituted cycloalkyl group or alkoxyl group having 1 to 8 carbon atoms or an optionally substituted aryl group having 6 to 10 carbon atoms or for chlorine, where $R_2$ stands for an optionally substituted cycloalkyl group or alkoxyl group having 1 to 8 carbon atoms or an optionally substituted aryl group having 6 to 10 carbon atoms or for chlorine, and B) 99.5–0.5 wt. %, preferably 50 to 10 wt. % of a polyaryl(meth)acrylate containing 20–100 wt. % of monomers of the formula (II)

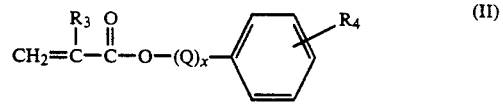

where $R_3$ stands for hydrogen or methyl, Q stands for an alkylidene group having 1 to 6 carbon atoms or a group $-(CH_2)_m-O-$, where m denotes a number from 2 to 6, x stands for zero or 1 and $R_4$ stands for hydrogen, an alkyl or alkoxyl group having 1 to 6 carbon atoms or an aminoalkyl group having 1 to 6 carbon atoms, which may be substituted at nitrogen with alkyl groups having 1 to 6 carbon atoms.

12 Claims, No Drawings

COMPATIBLE POLYMER BLENDS

BACKGROUND OF THE INVENTION

1. Field of the Invention

The invention relates to compatible polymer blends of polyphenylene ether and copolymers of (meth)acrylates with phenyl groups in the side chains.

2. Discussion of the Background

Empirical experience with experiments mixing different polymers has already been reduced to the much quoted common denominator: "Miscibility is the exception; immiscibility is the rule". (Cf. Kirk-Othmer, 3rd edition, vol. 18, pp. 443–478, 460 ff, J. Wiley 1982).

Such an exception is, for example, e.g., the compatible system of polyphenylene ether (PPE) and polystyrene (PS). PPE/PS blends exhibit one glass temperature over the entire mixing range and are transparent. They represent one of the first examples known in the literature of compatible polymer blends. (Cf. T. K. Kwei, H. L. Frisch, Macromolecules, 11:1267 (1978); Kirk-Othmer, loc. cit., Vol. 16, 594–605, 603 ff). Poly-2,6-dimethyl-1,4-phenylene oxides (DMPPO) and polystyrene form other compatible polymer blends (cf. S. Krause, J. Macromol. Sci. Rev. Macromol. Chem. 7:251 (1972); Brandrup-Immergut, Polymer Handbook, 3rd edition, VI-347, J. Wiley (1989).

Starting from this knowledge, a number of studies have analyzed the impact modification of brittle PPE with elastomer phases, which were grafted with PS or styrene copolymers. Preferably block polymers such as polystyrene-b-polybutadiene, ABS-terpolymers and SAN-grafted elastomer phases are added as impact modifiers.

A fundamental drawback of pure PPE and the aforementioned mixtures is the extreme instability with respect to UV and visible light with the consequence of a notorious instability under weathering conditions. Thus, for example, as a commercial product, a PPE/polyamide blend shows a noticeable yellow tinge and a dull surface after 500 hours of the Xenotest-accelerated weathering test. Polyaryl(meth)acrylates have proven to be compatible with polycarbonates (DE-A 37 19 239) and polyesters (German patent application P 40 03 088.1).

SUMMARY OF THE INVENTION

One object of the present invention is to provide stable PPE polymer blends which avoid the instabilities of prior art blends without simultaneously reducing the quality of other physical properties of the polymer blend.

It has now been discovered that compatible polymer blends containing (A) 0.5–99.5 wt. % of a polyphenylene ether and (B) 99.5–0.5 wt. % of a polyaryl(meth)acrylate exhibit compatibilty without degradation of desirable polymer properties.

DETAILED DESCRIPTION OF THE PREFERRED EMBODIMENTS

As a model for the cause of compatibility, an electron-donor-acceptor interaction between polyester or polycarbonate as acceptor and polyaryl(meth)acrylate as donor has been considered. Surprisingly, it has been found that specific polyphenylene ethers form compatible polymer blends with polyaryl(meth)acrylates. This situation is even more unexpected since, as defined by the model for this kind of polyphenylene ether, donor properties would have been expected, i.e., an electron-donor-acceptor interaction with the polyaryl(meth)acrylate also acting as donor appears a priori improbable.

The invention relates to compatible polymer blends comprising

A) 0.5–99.5 wt. %, preferably 50 to 90 wt. % of a polyphenylene ether, containing monomer units of formula (I)

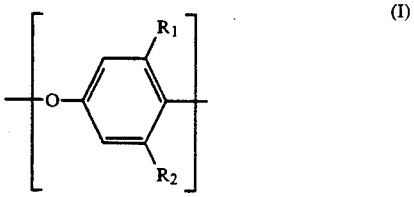

where $R_1$ stands for an optionally substituted cycloalkyl or alkoxy group having 1 to 8 carbon atoms, an optionally substituted aryl group having 6 to 10 carbon atoms or chlorine, $R_2$ stands for an optionally substituted, cycloalkyl or alkoxy group having 1 to 8 carbon atoms, an optionally substituted aryl group having 6 to 10 carbon atoms or chlorine, and B) 99.5–0.5 wt. %, preferably 50 to 10 wt. % of a polyaryl (meth)acrylate containing 20–100 wt. % of monomers of the formula (II)

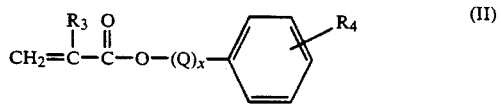

where $R_3$ stands for hydrogen or methyl,

Q stands for an alkylidene group having 1 to 6, preferably 1 to 4 carbon atoms or a group $-(CH_2)_m-O-$, where m denotes a number from 2 to 6, x stands for zero or 1 and $R_4$ stands for hydrogen an alkyl or alkoxy group having 1 to 6 carbon atoms or an aminoalkyl group having 1 to 6 carbon atoms, which may be substituted at nitrogen with alkyl groups having 1 to 6 carbon atoms.

THE POLYMERS A

The polymers A) are known (cf. Kirk-Othmer, loc. cit). In part they represent trade products. When $R_1$ and $R_2$ are aryl, they are preferably a phenyl, benzyl, or naphthyl group. The optionally present substituents on the aryl group are preferably phenyl and/or alkyl groups having 1 to 4 carbon atoms. In particular, polyphenylene ethers are preferred in which both groups $R_1$ and $R_2$ are methyl or phenyl. Specific examples include poly-2,6-dimethyl-1,4-phenylene oxide (compound A-1) and poly-2,6-diphenyl-1,4-phenylene oxide (compound A-2). Other preferred compounds include poly-2-phenyl-6-methyl-1,4-phenylene oxide (compound A-3), poly-2-benzyl-6-methyl-1,4-phenylene oxide (compound A-4), poly-2-isopropyl-6-methyl-1,4-phenylene oxide (compound A-5), poly-2,6-dimethoxy-1,4-phenylene oxide (compound A-6), poly-2,6-dichloro-1,4-phenylene oxide (compound A-7), poly-2-m-tolyl-6-phenyl-1,4-phenylene oxide (compound A-8), poly-2-p-tolyl-6-phenyl-1,4-phenylene oxide (compound A-9), poly-2-(4-tert.-butyl)phenyl-6-phenyl-1,4-phenylene oxide (compound A-10), and poly-2-α-naphthyl-6-phenyl-1,4-phenylene oxide (compound A-11).

The terminal positions on the polymer chain can be conventionally capped with known aryl groups or through acylation (acetylation).

To prepare the polyphenylene ethers, various methods can be used, for example, oxidative coupling. Thus, one method for obtaining polymer A-1 is through polycondensation of 2,6-dimethyl phenol in the presence of basic copper-amine complexes according to known procedures. Even copolymers, which are synthesized from different monomer units of formula I, are possible.

As a rule, the molecular weights of the polyphenylene ethers lie in the range Mn=1,000-20,000. With the exception of polymer A-4 (Tg=99° C.), the aforementioned polymers A) exhibit glass transition temperatures > 140° C., predominantly even > 200° C. (Cf. Kirk-Othmer, loc. cit.).

THE POLYMERS B)

The polymers B) are synthesized from optionally different, well-known monomers of formula II. In the synthesis, radically polymerizable monomers, preferably of the formula III

can also be used in quantities ranging from 80-0 wt. %, preferably from 50 to 5 wt. %, where $R_3'$ stands for hydrogen or methyl and Z stands for a phenyl group optionally substituted with an alkyl group having 1 to 4 carbon atoms, or for a group

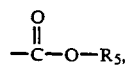

where $R_3$ stands for an optionally branched alkyl group having 1 to 8 carbon atoms or a cyclohexyl group or for a group

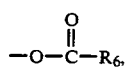

wherein $R_6$ stands for methyl or ethyl. Preferably the monomers of the formulas II and III make up 100 wt. % of the monomers of polymer B.

Examples of monomers of formula II are phenyl(meth)acrylate, 4-tert.-butylphenyl(meth)acrylate, 4-methoxyphenyl(meth)acrylate, benzyl(meth)acrylate, 1-phenylethyl(meth)acrylate, 2-phenylethyl(meth)acrylate, 3-phenylpropyl(meth)acrylate, 2-phenoxyethyl(meth)acrylate, and 2-naphthyl(meth)acrylate.

Examples of monomers of formula III are methyl methacrylate, styrene, α-methyl styrene, vinyl acetate, and vinyl propionate The preparation of polymers or copolymers B) is conducted as emulsion polymerization or suspension polymerization according to known methods for polymerization of α,β-unsaturated compounds, in particular radical polymerization, for example, in bulk or in solution. (Cf. H. Rauch-Puntigam, The Völker, Acryl- und Methacryl-Verbindungen, Springer Verlag, 1967; Houben-Weyl, 4th edition, vol. XIV/I, 66:1010 Georg Thieme, 1961; vol. XXE, 1141-1176, Georg Thieme 1987). Methods of group-transfer polymerization are also suitable.

For radical polymerization, conventional radical initiators, for example peroxidic compounds, in particular organic peroxide compounds, such as dibenzoyl peroxide or dilauroyl peroxide, azo compounds such as azodiisobutyronitrile or optionally redox initiators in quantities ranging normally from approximately 0.01 to 2 wt. %, based on the monomers, are used. However, the initation radicals can also be prepared photochemically by known methods.

As a rule, the polymers or copolymers B) have molecular weights Mw in the range of 5,000 to 1,000,000 daltons, preferably in the range of 25,000 to 250,000, in particular 50,000 to 150,000 daltons. The nonuniformity lies generally in the range of 0.1-10. The molecular weight is determined preferably with gel permeation chromatography or with a light scattering method (cf. H. F. Mark et al., Ed. Encyclopedia of Polymer Science and Technology, 2nd edition, vol. 10, pp. 1-19, J. Wiley, 1987). Preferably, the reduced viscosity $n_{spec/c}$ (in accordance with DIN 51 562) in chloroform ranges from 18-65 ml/g, more preferably from 30-50 ml/g.

Known regulators, in particular the usual sulfur regulators, for example mercapto compounds, can be used as molecular weight regulators (cf. Houben Weyl, loc. cit., vol. XIV/I, p. 66). Generally, an addition of 0.1 to 0.5 wt. % of regulator, based on the monomers is preferred.

A preferred embodiment of the invention provides blends containing 95-5 wt. % of the polyphenylene ether A) and 5-95 wt. % of a two phase copolymer B1) as an impact modifier. Compolymer B1) contains a component which is compatible with the polyphenylene ether, where the two phase copolymer B1) contains b11) 20-90 wt. %, preferably 30-50 wt. % of an optionally crosslinked polymer having a glass transition temperature Tg < 10° C., preferably < −10° C. and b12) 80-10 wt. %, preferably 70-50 wt. % of a polymer, bonded covalently to polymer b11), where polymer b12) contains in part (preferably at least 50 wt. %) monomers (II). In this embodiment, polymer B) is a two-phase copolymer containing b11) and b12).

The polymer b11) is synthesized in an advantageous manner from one or more monomers of formula III, provided the resulting glass transition temperature Tg < 10° C. The contributions of the monomers to the glass temperature can be precalculated according to Vieweg-Esser, Kunststoff-Handbuch, vol. IX, Polymethacrylate, pp. 333-340, Carl Hanser Verlag, 1975, or F. H. Mark et al., Encyclopedia of Polymer Science and Technology, 2nd. edition, vol. 7, pp. 531-544, J. Wiley, 1987; Brandrup-Immergut, Polymer Handbook, 3rd edition, VI-209, J. Wiley, 1989. Examples of monomers or monomer components of polymer b11) include butadiene, 1,5-octadiene, mixtures of ethylene, propylene and dienes (EPDM), and butylacrylate.

The polymers b11) may also contain 0.1 to 10 wt. % of crosslinking monomers, for example, multifunctional monomers described in Rauch-Puntigam and Völker, loc. cit., p. 184.

The molecular weight Mn of the polymers b11) in the noncrosslinked state preferably lies in the range of $10^4$ to $5 \times 10^5$. The polymer component b12) is synthesized in an advantageous manner from monomers described above for polymer B). The molecular weight Mn of the polymer b12) lies in the range of $10^4$ to $10^6$.

Another preferred embodiment of the present invention comprises a copolymer B2) containing b21) 99.9 to 50 wt. %, preferably 99 to 80 wt. % of the monomers described above for polymer B) and b22) 0.1–50 wt. %, preferably 1 to 20 wt. % of the comonomers with UV light absorbing groups and/or low molecular weight UV absorbing compounds, where the copolymer B2) is used as a cover layer on a polyphenyl ether substrate which, as a rule, is unstable to UV, or on polymer blends containing polyphenylene ether. The components b21) +b22) preferably make up 100 wt. % of copolymer B2).

The UV light absorbing monomers or the low molecular weight UV absorbing compounds exhibit a high absorption capability (transmission $<10^{-4}$) in the range between 290 and 400 nm.

The UV light absorbing comonomers and suitable copolymerization conditions are described, for example, in DE-C 33 12 611; U.S. Pat. No. 4,576,870; GB-B 2,146,647; U.S. Pat. No. 4,612,358 and U.S. Pat. No. 4,652,656. Specific compounds include especially benzotriazole-(meth)acrylamides; and in the latter cited U.S. patents, especially 3-(2-benzotriazolyl)-2-hydroxy-5-tert.-octylbenzlymethacrylamide.

Suitable UV light absorbing low molecular weight additives as disclosed in H. Batzer ed., Polymere Werkstoffe, Vol. III, Technology 1, pp. 395–404, Georg Thieme-Verlag, 1984; R. Gächler and H. Müller, Taschenbuch der Kunststoff-Additive, pp. 105–143, C. Hanser Verlag, 1979; F. Mark at al., Encyclopedia of Polymer Science & Technology, 2nd. Ed., Vol. 7, pp. 796–827, J. Wiley, 1989; ibidem vol. 15, pp. 539–583, J. Wiley, 1989. Weathering tests (Xenotest) are described in the two latter citations. Benzotriazole and/or benzophenone derivatives are especially suitable low molecular weight UV absorbing compounds.

In the context of the present invention and in harmony with the ideas that are typical in the practice of polymer chemistry, the term "compatible blend" is to be understood as meaning a stabile homogeneous blend (miscible blend), which macroscopically exhibits the properties of a single phase material. (Cf. Kirk-Othmer, Vol. 18, pp. 446, 457–60; J. Brandrup & E. H. Immergut, "Polymer Handbook", 2nd edition.)

Methods of determining "compatibility" include:

I) The observation of the glass transition temperature Tg. Provided that the polymer components exhibit glass transistion temperatures that lie far enough apart to be differentiated dilatometrically, dielectrically or radioluminescence-spectroscopically by "differential scanning calorimetry"(DSC), existing compatibility is indicated by a shift in or by the disappearance of the Tg's of the individual polymer components. (Cf. Olabisi et al. in Polymer-Polymer-Miscibility, pp. 21, 123, Academic Press, 1979).

II) The "optical method"

From a homogeneous solution of the polymer components, a film is cast that may not exhibit any optically perceivable inhomogeneity even during enlargement following drying.

III) As another test for miscibility of different polymers, the occurrence of the lower critical solution temperature (LCST) is used. (Cf. DE-A 34 36 476.5 and DE-A 34 36 477.3).

The occurrence of the LCST is determined by heating the polymer blend which was clear and homogeneous, and observing whether or not the blend separates into phases and becomes optically cloudy to opaque. This behavior represents, according to the literature, unequivocal proof that the original polymer blend comprised a single phase that was homogeneous in equilibrium. The polymer blends according to the present invention exhibit a LCST, according to all present experience.

The compatible blends may be prepared by various methods. They are made, e.g., by intensive mechanical mixing of the components A) and B) in the melt, in extruders, kneaders, etc.; or they may also be prepared from a common solution as so-called "solution cast polyblends" (cf. Kirk-Othmer, "Encyclopedia of Chemical Technology", 3rd. ed., Vol. 18, pp. 442–478, J. Wiley, 1982). As a rule, blends of the components A) and B) are produced first, where one starts advantageously from solids in the form, for example, of a granulate, using slowly running mixers such as drum, wheel, or double chamber bar mixers. The slowly running mixers cause a mechanical mixing without eliminating the phase boundaries (cf. Ullmann's Encyklopedie der Technischen Chemie, 4th Edition, Vol. 2, pp. 282–311, Verlag Chemie). Thermoplastic preparation follows by means of homogeneous mixing in the melt using heatable mixers at suitable temperatures, e.g., 150° C. to below about 300° C., in kneaders such as the Brabender-kneader type or preferably extruders, e.g., single or multiple screw extruders or optionally in extruders with oscillating screws and shear pins (e.g. in BUSSCO ® kneaders).

The polymer blends comprising components A) and B1) are prepared in an analogous manner. When mixing in the melt state, the melt should not be subjected to high temperatures (T>300° C.), since the polymer blend tends to turn yellow. According to these methods, granules of a uniform particle size can be manufactured (e.g. hot-cut, cubed, round). The particle size of the granules is generally in the range of 2 to 5 mm. The polyphenylene ether substrates can be coated with the copolymer B2) in an advantageous manner as follows.

The copolymer is applied by means of a solvent, preferably toluene, on the substrate to be coated as a paint having a dry film thickness which guarantees that the UV light transmission in the wavelength range 290–400 nm is less than $10^{"4}$. Preferably coextrusion is chosen as the solvent free application technology.

The (co)polymers of the invention are used primarily as impact modifiers for polyphenylene ether and as cover layers, which protect the polyphenylene ether substrate from harmful UV irradiation. The compatibility of the cover layers provides, on the one hand, for good adhesion and on the other hand, coated substrates can be reincorporated into virgin substrate material without loss of properties (which is usually caused by incompatibility).

Other features of the invention will become apparent in the course of the following descriptions of exemplary embodiments which are given for illustration of the invention and are not intended to be limiting thereof.

EXAMPLES

The polymer blends of the invention were prepared by melt mixing in a STORCK laboratory extruder at 250°–280° C. or by mixing in a toluene solution and subsequently casting films, which were dried under vacuum (1 mbar) for 24 hours. The copolymers used in the following examples were prepared by polymerization in bulk. In addition to the comonomers listed, 0.2 wt. % of dilauroyl peroxide and 0.05 wt. % of 2,2'-bis(-tert.-butylperoxy)butane were used as initiators and 0.4 wt. % of dodecylmercaptan was used as a molecular weight regulator. The mixture was polymerized for 24 hours in a water bath at 50° C. For the final polymerization, the polymer was heated at 110° C. for 12 hours. The average molecular weights (Mw) range from $8-10 \times 10^4$.

EXAMPLE 1

50 wt. % of 2,6-dimethyl-polyphenylene ether (PPE PT88 Hüls AG, Mw=35,000 from solution viscosity) were mixed with 50 wt. % of polyphenylmethacrylate (PMA) in a mixing extruder. The resulting polymer blend was transparent and exhibited a turbidity point (LCST) of 135° C. (the LCST was determined visually on a KOFLER hot plate).

EXAMPLE 2

10 wt. % PPE PT88 and 10 wt. % PMA were dissolved in 90 wt. % toluene respectively, the solutions were combined and dried to a film with 50 wt. % PPE PT88 and 50 wt. % PMA under a vacuum at approximately 80° C. and 1 mbar. The resulting polymer blend was transparent and exhibited a LCST of 145° C.

EXAMPLE 3

50 wt. % PPE PT88 and 50 wt. % of a copolymer, comprising 50 wt. % of styrene and 50 wt. % of phenylmethacrylate, were mixed in the mixing extruder according to example 1. The resulting transparent polymer blend exhibited a LCST of 113° C.

EXAMPLE 4

10 wt. % PPE PT88 and 10 wt. % of the copolymer according to Example 3 were mixed and prepared as a film having the composition 50 wt. % of PPE PT88 and 50 wt. % of the copolymer, according to example 2. The transparent film exhibited a LCST of 114° C.

EXAMPLE 5

50 wt. % PPE PT88 and 50 wt. % of a copolymer, comprising 75 wt. % of p-methoxyphenylmethacrylate (MPMA) and 25 wt. % of styrene, were mixed according to example 1. The resulting transparent polymer blend exhibited a LCST of 130° C.

EXAMPLE 6

10 wt. % PPE PT88 and 10 wt. % of the copolymer, according to Example 5, were prepared according to Example 2, as a film having the composition 50 wt. % of PPE PT88 and 50 wt. % of the copolymer. The film was transparent and exhibited a LCST of 150° C.

EXAMPLE 7

50 wt. % PPE PT88 and 50 wt. % of a copolymer, comprising 50 wt. % of MPMA and 50 wt. % of styrene were mixed according to example 1. The resulting transparent polymer blend exhibited a LCST of 135° C.

EXAMPLE 8

50 wt. % PPE PT88 and 50 wt. % of a copolymer, comprising 50 wt. % MPMA, 25 wt. % styrene and 25 wt. % methyl methacrylate were mixed according to Example 1. The transparent polymer blend exhibited a LCST of 117° C.

EXAMPLE 9

10 wt. % PPE PT88 and 10 wt. % of benzyl methacrylate (BMA) were dissolved in 90 wt. % toluene respectively and prepared according to example 2, as a film having the composition 50 wt. % PPE PT88 and 50 wt. % BMA. The resulting polymer blend exhibited a LCST of 116° C.

EXAMPLE 10

10 wt. % PPE PT88 and 10 wt. % of poly-3-phenyl-propyl-methacrylate (PPMA) were dissolved in 90 wt. % toluene respectively and prepared according to Example 2, as a film having the composition 50 wt. % PPE PT88 and 50 wt. % PPMA. The transparent polymer blend exhibited a LCST of 70° C.

EXAMPLE 11

10 wt. % ppE pT88 and 10 wt. % of polybenzylacrylate (BA) were dissolved in 90 wt. % toluene respectively and prepared according to example 2, as a film having the composition 50 wt. % PPE PT88 and 50 wt. % BA. The resulting film was transparent and exhibited a LCST of 105° C.

EXAMPLE 12 (Weathering protection for PPE or PPE blends)

A double walled sheet, made of a blend of PPE and polyamide (NORYL GTX, General Electric Plastics), was coated with a mixture of 45 wt. % of a copolymer, comprising 55 wt. % styrene, 35 wt. % benzylacrylate and 10 wt. % 3-(2-benzotriazolyl)-2-hydroxy-5-tert-octylbenzyl-methacrylamide (polymerizable UV absorber based on benzotriazole), and 55 wt. % 1-methoxy-2-propanol. The thickness of the dry film (copolymer following evaporation of the solvent) was 7 μm. Following 500 hours of the Xenotest-accelerated weathering test (wavelength 290 nm) the test sample showed a light yellow tinge, after 1,000 hours a noticeable yellow tinge, and after 1,500 hours a severe yellow tinge. The adhesion of the layer was good; it did not peel in the cross-hatch adhesion test or the Tesa-test.

EXAMPLE 13 (reference example)

A noncoated double walled sheet made of NORYL GTX exhibited a severe yellow to brown tinge after 500 hours of the Xenotest-accelerated weathering test and also a dull surface, a feature that indicates pronounced erosion. These weathering phenomena do not occur with the coated test sample according to example 12 after 1,500 hours of Xenotest weathering.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A compatible miscible polymer blend, consisting essentially of
   A) 0.5-99.5 wt. % of a polyphenylene ether, containing monomer units of formula (I)

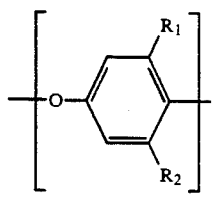 (I)

wherein
$R_1$ is a $C_{1-8}$cycloalkyl, $C_{1-8}$alkoxy, $C_{6-10}$ aryl, or chlorine,
$R_2$ is $C_{1-8}$cycloalkyl, $C_{1-8}$alkoxy, $C_{6-10}$ aryl, or chlorine and B) 99.5–0.5 wt. % of a polyaryl(meth)arcylate containing 20–100 wt. % of monomer units from monomers of the formula (II)

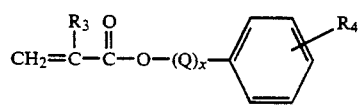 (II)

wherein
$R_3$ is hydrogen or methyl,
Q is a $C_{1-6}$alkylidene group or a group —($CH_2$)$_m$—O—, where m is a number from 2 to 6,
x is zero or 1 and
$R_4$ is hydrogen $C_{1-6}$alkyl, $C_{1-6}$alkoxy, $C_{1-6}$alkylamino, or $C_{1-6}$alkylamino substituted at nitrogen with $C_{1-6}$alkyl groups.

2. The polymer blend of claim 1, wherein said blend contains 50–10 wt. % of polyaryl(meth)acrylate component B.

3. The polymer blend of claim 1, wherein Q is a $C_{1-4}$alkylidene group.

4. The polymer blend of claim 1, wherein $R_1$ or $R_2$ is a $C_{1-8}$acycloalkyl, $C_{1-8}$alkoxy or $C_{6-10}$aryl group substituted with phenyl, $C_{1-4}$alkyl groups or mixtures thereof.

5. The polymer blend of claim 1, wherein $R_1$ and $R_2$ are both methyl or phenyl.

6. The polymer blend of claim 1, wherein said aryl group is a phenyl, benzyl or naphthyl group.

7. The polymer blend of claim 1, wherein polyphenylene ether component A has a molecular weight Mn in the range 1,000–20,000.

8. The polymer blend of claim 1, wherein said polyphenylene ether component A has a glass transition temperature Tg greater than 140° C.

9. The polymer blend of claim 1, wherein polyaryl(meth)acrylate component B further contains monomer units obtained from monomers having formula (III)

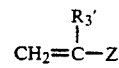 (III)

in an amount up to 80 wt. %, wherein $R_3'$ is hydrogen or methyl and Z is phenyl, $C_{1-4}$alkyl substituted phenyl, —C(O)—O—$R_3$, wherein $R_5$ is $C_{1-8}$alkyl or cyclohexyl, —O—C(O)—$R_6$, wherein $R_6$ is methyl or ethyl.

10. The polymer blend of claim 9, wherein the monomer of formula (III) is selected from the group consisting of methyl methacrylate, styrene, α-methyl styrene, vinyl acetate and vinyl propionate.

11. A method of reducing discoloration in a polyphenylene ether polymer or copolymer, consisting essentially of with said polyphenylene ether polymer or copolymer 99.5–0.5 wt. % of a polyaryl(meth)acrylate containing 20–100 wt. % monomer units from monomers of formula (II)

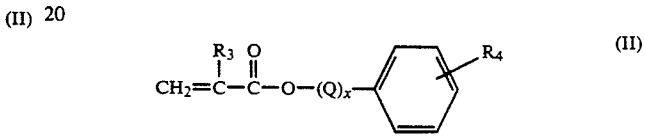 (II)

wherein
$R_3$ hydrogen or methyl,
Q is a $C_{1-6}$alkylidene group or a group —($CH_2$)$_m$—O—, wherein m is a number from 2–6,
x is 0 or 1 and
$R_4$ is hydrogen $C_{1-6}$alkyl, $C_{1-6}$alkoxy, $C_{1-6}$alkylamino, or $C_{1-6}$-alkylamino substituted at nitrogen with $C_{1-6}$alkyl groups.

12. A method of improving the impact resistance of a polyphenylene ether polymer or copolymer, consisting essentially of blending with said polyphenylene ether polymer or copolymer, 99.5–0.5 wt. % of a polyaryl(meth)arcylate containing 20–100 wt. % monomer units from monomers of formula (II)

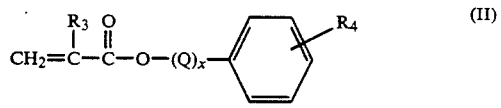 (II)

wherein
$R_3$ hydrogen or methyl,
Q is a $C_{1-6}$alkylidene group or a group —($CH_2$)$_m$—O—, wherein m is a number from 2–6,
x is 0 or 1 and
$R_4$ is hydrogen $C_{1-6}$alkyl, $C_{1-6}$alkoxy, $C_{1-6}$alkylamino, or $C_{1-6}$alkylamino substituted at nitrogen with $C_{1-6}$alkyl groups.

* * * * *